United States Patent Office 3,365,385
Patented Jan. 23, 1968

3,365,385
HYDROREFINING OF PETROLEUM WAX FRACTIONS
Nicholas L. Kay and Edward A. Pullen, Fullerton, and Cloyd P. Reeg, Orange, Calif., assignors to Union Oil Company of California, Los Angeles, Calif., a corporation of California
No Drawing. Continuation-in-part of application Ser. No. 131,063, Aug. 11, 1961. This application Oct. 6, 1964, Ser. No. 401,966
6 Claims. (Cl. 208—27)

This application is a continuation-in-part of application Ser. No. 131,063, filed Aug. 11, 1961, now abandoned.

This invention relates to methods for refining crude microwax petrolatum derived as bottoms from the vacuum distillation of full-range petroleum waxes, and more particularly is concerned with the manufacture of microcrystalline wax characterized by excellent stability and color characteristics. In broad aspect, the process involves a catalytic hydrogenation, or "hydrofining" technique wherein the process variables, i.e., pressure, temperature, space velocity, etc., are correlated within specific ranges in order to effect the desired decolorization without appreciable cracking or isomerization. The hydrogenation technique involves a flooded-bed contacting, such as may be obtained by concurrent upflow of hydrogen and the liquid wax fraction through the catalyst bed. An important feature of the invention resides in the use of low space velocities, i.e., below about 0.4, and preferably below about 0.25. The use of low space velocities has been found to be critical to the attaining of a suitably decolorized and stable product under process conditions sufficiently economical for use in connection with the particular feedstock involved. The flooded-bed contacting feature of the invention is also correlated with overall economics, as will be more particularly pointed out hereinafter.

The feedstocks treated herein are obtained as residue from the vacuum distillation of the total wax fraction recovered from deasphalted crude oil residua. The overhead from such distillation constitutes "slack wax," from which commercial paraffin wax is derived. The bottom fraction, referred to herein as "petroleum," is ordinarily of a dark brown to black color, and contains from about 20% to 90% microcrystalline wax. It may be subjected to a deoiling treatment to produce the product commonly referred to as microcrystalline wax, or "microwax." This microwax has become an important article of commerce, and is used in the manufacture of many products including food containers, wax paper, explosives, matches, etc.

Several methods have previously been suggested for refining and decolorizing petroleum wax fractions. Perhaps the most widely used process involves contacting such fractions with adsorbent materials such as alumina, silica gel, clay, activated carbon, or the like. More recently, various hydrogenation techniques have been suggested. While the hydrogenation technique is in many respects preferable to the adsorption techniques, its area of usefulness has been fairly limited in the field of wax refining. In order to obtain acceptable run lengths and catalyst life, feedstocks have been limited mainly to refined distillate paraffin waxes, or full-range wax fractions which have been subjected to considerable pre-refinement, as by deasphalting, de-oiling, etc. Stocks such as these are relatively light in color, and contain relatively low concentrations of catalyst-deactivating compounds such as asphaltenes, condensed-ring aromatic compounds, heavy polyolefins and the like.

In developing the process of this invention, it was recognized at the outset that the heavier, more highly contaminated and darker colored residual petroleum feedstocks to be treated would require relatively severe hydrogenation conditions for effective decolorization. The basic problem involved the selection of a proper combination of catalyst and hydrogenation conditions, mainly of pressure, temperature and space velocity, which would give the desired decolorization without rapid catalyst deactivation and without bringing about more fundamental changes in hydrocarbon structure, as by cracking, isomerization and the like. Economic considerations were also a primary factor.

To understand the economic factors involved in the hydrorefining or microwax fractions, it must be appreciated firstly that these fractions constitute a relatively minor volume of total refinery products, and therefore large and expensive hydrogenation facilities are normally not warranted. Perhaps the principal factors which contribute to the expense of hydrogenation facilities center about the use of high pressures, above about 1,000 p.s.i.g., and the use of very low space velocities which necessitate large reactors and large catalyst volumes per barrel of feed treated. The use of high pressures involves at least two component items of expense, viz., a source of high-pressure hydrogen, and the expensive, heavy-walled reactors required. It was hence highly desirable to devise a process which could succesfully utilize the low pressure off-gases from conventional hydrorefining and/or reforming units without repressuring, i.e., at pressures below about 900 p.s.i.g.

In conventional hydrorefining operations on naphtha and gas oil feeds, wherein the primary objective is to reduce the sulfur and nitrogen contents, economically attractive space velocities are normally obtained by operating at relatively high temperatures, e.g., above about 750° F. In the case of petrolatum feeds, however, it has been found that satisfactory decolorization at pressures below about 900 p.s.i.g. is not normally obtainable at temperatures above about 750° F. But, operating at lower temperatures leads to the economically undesirable alternatives of using high pressures, or very low space velocities. The present invention is based upon our discovery that the microwax petrolatum feeds may be satisfactorily decolorized at temperatures of 600° to 750° F., and at pressures below about 900 p.s.i.g., if the space velocity is maintained at between about 0.05 and 0.4, and if the residence time of the liquid phase is maximized by using the flooded-bed contacting technique. Without the flooded-bed technique, even lower space velocities would be required, necessitating the use of prohibitively large reactors and catalyst volumes. Thus, by utilizing either concurrent upflow of feedstock and hydrogen, or counter-current downflow of feed with upflow of hydrogen, a liquid level can be maintained in the catalyst bed, thereby insuring a relatively longer residence time for the liquid phase than would prevail at the same space velocity in a conventional downflow reactor. The effectiveness of increased residence time came as somewhat of a surprise, since residence time per se is normally a relatively insignificant factor in heterogeneous catalysis, total throughput rate, or liquid hourly space velocity, being the principal significant variable.

From the above, it will be apparent that the principal objective of this invention is to provide an economically attractive hydrofining treatment for residual microwax feedstocks, utilizing relatively low temperatures and pressures. A more specific objective is to minimize the economically undesirable effects of operating at extremely low space velocities. The overall objective is to provide a low temperature, low pressure hydrofining operation for decolorizing residual microwax feeds, utilizing a minimum catalyst volume and reactor space. A further objective is to provide methods for decolorizing microwax feeds while maintaining satisfactory catalyst activity for at least about 10 days between regenerations without resorting to expensive preliminary refining as, e.g., by deasphalting. Other objectives will be apparent from the more detailed description which follows.

The following flow diagram illustrates the derivation of the petrolatum feedstocks treated herein:

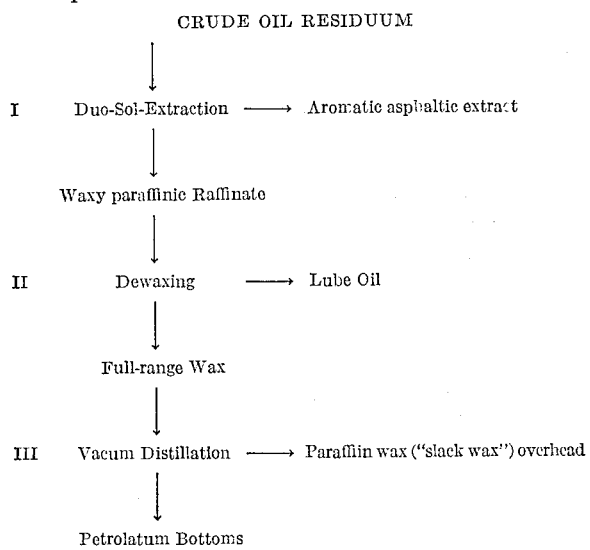

In Step I, "Duo-Sol" extraction is performed by countercurrent extraction with propane and a phenolic solvent such as cresylic acids. Dewaxing Step II is a conventional propane dewaxing wherein the propane raffinate from Step I is chilled with concurrent evaporation of propane to precipitate the total wax component. Vacuum distillation Step III is carried out at reduced pressures of, e.g., 2–50 mm. of mercury, and at pot temperatures in the range of about 550–720° F. During this distillation, low-melting paraffin waxes boiling below about 600° F. (2 mm.) are taken overhead. The residual microwax petrolatum boils above about 500° F. at 2 mm., and due to the substantially complete removal of paraffin wax, and also to thermal degradation occurring at the maximum temperatures reached in the reboiler, is very dark in color and rich in condensed polycyclics.

For purposes of this invention, the critical characterizations of the petrolatum feedstocks relate to color, boiling range and polyaromatic content. Quantitative color determinations are rendered somewhat difficult because these feedstocks are so dark in color that they are off the conventional color scales. Under these circumstances, color determinations can be made only by diluting the sample with a water-white diluent such as kerosene. Two well known color scales in the dark range are the Tag-Robinson scale and the ASTM D–1500 scale, which correlate as follows:

| Tag-Robinson: | ASTM D–1500 |
|---|---|
| 21 | [1] 0.5 |
| 19 | 1 |
| 15 | 2 |
| 11 | 3 |
| 7.5 | 4 |
| 5 | 5 |
| 3 | 6 |
| 1.7 | 7 |
| 1.2 | 8 |
| 1.0 | [2](8.5) |

[1] Pale yellow.
[2] Dark brown.

The petrolatum feeds of this invention are characterized as being darker than 1.0 on the Tag-Robinson scale and darker than 8 on the ASTM scale, even when diluted to form a 25 vol. percent solution in kerosene. In most cases, even a 15% solution in kerosene is off both color scales. The principal objective of the hydrofining treatment is to reduce the color to a maximum of 3.0 on the ASTM scale in order to meet requirements set by the Food and Drug Administration for waxes to be used in food packaging containers. The hydrofining process described herein is found to achieve this objective without resort to expensive preliminary refining measures such as deasphalting, which have been considered essential in the past when dealing with refractory feeds of this nature.

Polyaromatic content (or "carbonizable matter" content) of the petrolatum feeds is directly reflected by the absorption coefficient for ultra violet radiation in the 290–330 millimicron wave length band. The absorption coefficient of the feeds treated herein ranges between about 1.0 and 3.5 liters/gm. cm. at wave lengths in the 290–330 millimicron range.

In other respects, the petrolatum feeds may be characterized as boiling between about 500° and 700° F. at 2 mm. of mercury and as having a specific gravity between about 0.81 and 0.85, an ASTM D–938 congealing point between about 150° and 170° F., a refractive index (at 100° C.) between about 1.45 and 1.46, and an oil content of about 5–50% by weight. It is preferred to subject the petrolatum directly to hydrofining, because during hydrofining a small amount of oil is usually formed, requiring a subsequent deoiling step. It is therefore preferable to postpone the final deoiling until after the hydrofining treatment.

The hydrofining operation is carried out in a conventional reactor containing a fixed bed of granular catalyst. Preferably, the catalyst is in a somewhat more finely subdivided state than is normal, as for example 1/16-inch pellets, or 8 to 20 mesh granules. The feedstock is preheated to the desired hydrofining temperature, and pumped through the reactor, either upflow or downflow. If the upflow procedure is employed, the hydrogen is pumped concurrently upwardly along with the feed, and this inherently will maintain the catalyst bed submerged in liquid feed, i.e., the feed will form a substantially continuous phase, filling the interstices between the catalyst granules. If the feed is passed downwardly through the catalyst bed, the hydrogen is then pumped upwardly countercurrently. The desired liquid level (preferably submerging the entire bed) is maintained by means of a liquid-level-controlled outlet valve at the bottom of the reactor. Hydrogen gas is pumped in near the bottom of the reactor and bubbles upwardly therethrough, and is removed from the top of the reactor. In either type of operation, it is found that suitable process conditions fall within the following ranges:

TABLE 1

| | Operative | Preferred |
|---|---|---|
| Temperature, ° F | 600–750 | 625–700 |
| Pressure, p.s.i.g | 300–900 | 400–750 |
| LHSV | 0.05–0.4 | 0.1–0.25 |
| H₂/oil ratios, s.c.f./bbl | 500–5,000 | 800–2,000 |

It will be understood that these conditions should be properly correlated. For optimum results, temperatures above 700° F. will normally be used only at higher pressures, i.e., above about 700 p.s.i.g., and temperatures below about 650° F. would be used in conjunction with space velocities below about 0.25 and pressures between about 300–600 p.s.i.g.

Suitable hydrofining catalysts for use herein include in general any of the Group VIB and/or Group VIII metals, their oxides and sulfides, either as such, or preferably supported upon an adsorbent oxide carrier such as alumina, titania, zirconia, silica gel, activated clays and the like. Particularly suitable catalysts comprise a combination of an iron-group metal oxide or sulfide (preferably an oxide or sulfide of cobalt or nickel) with a Group VIB metal oxide or sulfide (preferably an oxide or sulfide of molybdenum or tungsten). Preferred supports are activated alumina, or activated alumina stabilized by the addition of a small proportion (3%–15%) of silica gel. The total hydrogenating components may comprise between about 4% and 25% by weight of the finished catalyst. Preferred catalysts are the cobalt molybdate type, which contain between about 1% and 5% cobalt oxide or sulfide, and between about 5% and 20% (by weight) molybdenum oxide or sulfide. Preferably the catalyst is subjected to a presulfiding technique in order to convert the active hydrogenating components substantially completely to sulfide forms.

According to one modification to the process, a substantially inert diluent oil may be added to the petrolatum feed. Suitable diluent oils include for example light mineral oil fractions, kerosene, jet fuel fractions and the like. The principal function of the diluent is to lower the viscosity of the feed, thereby improving diffusion rates. It may also increase the solubility of hydrogen in the liquid feed. Moreover, vaporization of the diluent in the reactor may assist in providing additional agitation with resultant improved contacting efficiency. Particularly preferred diluents are those boiling in the kerosene range. Suitable proportions of diluent may range between about 10% and 80% by volume of the final mixture.

In order to obtain run lengths greater than about 30 days between catalyst regenerations, another technique has been found to be useful, namely, a periodic flushing of the catalyst with hydrogen. This is preferably achieved by simply interrupting the flow of feedstock every 7–10 days, while allowing hydrogen to continue flowing through the catalyst bed under process conditions for about 4–12 hours.

The following examples are cited to illustrate the critical effects of the process variables prescribed herein, and suitable operating procedures, but are not to be construed as limiting in scope:

EXAMPLE I

This example demonstrates the efficacy of upflow vs. downflow in wax hydrofining. The feed was a partially refined paraffin wax having a melting point of 158° F. and an ASTM D–1500 color of 4.0. In all runs, the catalyst was a presulfided composite of 3% CoO and 15% MoO₃ impregnated upon a pelleted 5% SiO₂, 95% Al₂O₃ carrier. All runs were carried out at 550° F. and 0.5 space velocity, using 1,000 s.c.f. of hydrogen per barrel of feed. In one series of runs (Series A) the preheated mixture of feed and hydrogen was passed downwardly through the catalyst bed, while in another series (Series B), the preheated mixture was passed upwardly so as to maintain the entire catalyst bed submerged in liquid feed, with hydrogen bubbling upwardly therethrough. The results were as follows:

TABLE 2

| Pressure, p.s.i.g. | Color of Product, ASTM D–1500 | |
|---|---|---|
| | Run Series A, Downflow | Run Series B, Upflow |
| 450 | | ¹ L 0.5 |
| 650 | 2.5 | L 0.5 |
| 1,000 | 2.5 | L 0.5 |
| 1,500 | 2.5 | L 0.5 |

¹ Prefix "L" means "lighter than" the designated number, but darker than the next lower ½ point on the scale.

It is thus obvious that, at all pressures, the upflow hydrofining is much more effective for decolorizing than the conventional downflow operation. In this example, the 0.5 space velocity at 550° F. was feasible only because the initial feed was a partially refined distillate paraffin wax, rather than an undistilled petrolatum fraction.

EXAMPLE II

This example demonstrates the critical effects of space velocity in treating an undistilled microwax. The feed was a microcrystalline wax (1.2% oil) having an ASTM D–938 melting point of about 170° F. and an ASTM D–1500 color darker than 8.0 even when diluted with 3 volumes of kerosene. The entire run was carried out at 675° F., and 450 p.s.i.g., using 1,000 s.c.f. of hydrogen per barrel of feed, but the liquid hourly space velocity was varied at several intervals. The flow of feed and hydrogen was upward, and the catalyst was the same as in Example I, except that it was ground to 8–12 mesh particle size. Product samples were collected at 1-hour intervals. The results were as follows:

TABLE 3

| Catalyst Age, Hours | LHSV | Color, ASTM D–1500 | Oil content, wt. percent, D–721 |
|---|---|---|---|
| 2 | 1.0 | L 1.5 | 4.4 |
| 3 | 1.0 | 2.0 | 3.3 |
| 4 | 1.0 | 2.5 | 2.7 |
| 5 | 1.0 | 3.0 | 3.7 |
| 6 | 1.0 | 3.5 | 2.4 |
| 7 | 0.5 | 4.0 | |
| 8 | 0.5 | 3.0 | |
| 9 | 0.5 | 3.0 | |
| 10 | 0.5 | L 3.0 | 3.1 |
| 11 | 0.5 | L 3.0 | 3.0 |
| 12 | 0.5 | L 3.0 | 3.1 |
| 15 | 0.25 | 2.5 | |
| 18 | 0.25 | L 2.0 | |
| 21 | 0.25 | L 2.0 | |
| 24 | 0.25 | L 2.0 | 3.9 |
| 25 | 1.0 | 3.0 | 3.6 |
| 26 | 1.0 | 4.5 | |
| 27 | 1.0 | 4.5 | 2.2 |
| 28 | 1.0 | L 5.0 | 2.3 |

From the foregoing data, it will be apparent that sustained and adequate decolorization was not obtainable except at space velocities below about 0.5. The initial high activity of the fresh catalyst at 1.0 space velocity soon declined, and on returning to the 1.0 space velocity after 24 hours on stream, the marked difference between operating at 0.25 and 1.0 space velocity is more readily apparent, the catalyst then having reached its equilibrium activity.

This example also demonstrates, in view of the significant though not excessive oil-synthesis, that deoiling should preferably be postponed until after the hydrofining operation.

EXAMPLE III

Another run was carried out which demonstrates that declining catalyst activity cannot be compensated for by raising the temperature above the optimum limits at the particular pressure used. The feed was a 50/50 mixture of a light mineral oil diluent and a crude petrolatum (17% oil) having an ASTM D–938 melting point of 158° F., a color darker than 8.0 on the ASTM D–1500 color scale when diluted to 15% concentration in kerosene, and an absorption coefficient of 1.88 at the 290 millimicron wave length. The catalyst was the same as that employed in Example I, except that it was ground to 10–20 mesh particle size. After 50 hours on stream, (concurrent upflow) and at 450 p.s.i.g., 0.2 LHSV, 675° F., and 1,000 s.c.f. of hydrogen per barrel of feed, the color of the undiluted petrolatum product was 3.5 on the ASTM D–1500 color scale. An attempt was made to improve the color by raising the temperature to 700° F., but at this low pressure, the color did not improve, but instead declined to 4.0 at the 58th hour on stream.

EXAMPLE IV

This example illustrates suitable operating conditions for extended run lengths of up to about 30–40 days. The catalyst was the same as in Example III, and the same petrolatum feed was used, but was diluted with 50° kerosene. The kerosene diluent is believed to be advantageous in providing increased hydrogen solubility in the feed, decreased viscosity and increased agitation, as previously noted. Run conditions were as follows:

*Contacting technique.—Concurrent upflow*

| | |
|---|---|
| Temperature, °F. | 675 |
| Pressure, p.s.i.g. | 750 |
| LHSV (based on diluted feed) | 0.2 |
| LHSV (based on undiluted feed) | 0.10 |
| $H_2$/oil ratio, s.c.f./bbl. | 1,000 |

The color of the undiluted product at the 18th hour of operation was 0.5, and at the end of 200 hours, about 2.5. During the run, it was found that the catalyst activity could be partially revived by periodically flushing with hydrogen, and/or by gradually lowering the space velocity, satisfactory decolorization can be maintained for run lengths of 30–40 days, after which the catalyst can be regenerated by conventional oxidation techniques.

The foregoing description of specific methods, catalysts and feeds is not intended to be limiting except where indicated. Many variations will occur to those skilled in the art, and all such variations which yield essentially the same result are intended to be included. The true scope of the invention is intended to be embraced within the following claims.

We claim:

1. A method for decolorizing a microwax petrolatum feedstock to a value below about 3.0 on the ASTM D–1500 color scale, said feedstock consisting essentially of undistilled bottoms from the vacuum distillation of a full-range petroleum wax fraction, and being characterized by: (1) a boiling range above about 500° F. at 2 mm., (2) an ASTM D–1500 color darker than 8 when diluted with three volumes of kerosene, and (3) an ultraviolet absorption coefficient between about 1.0 and 3.5 at 290 millimicrons, which comprises continuously passing said feedstock in liquid-phase through a catalytic hydrofining zone with added hydrogen in contact with a fixed bed of granular hydrofining catalyst at a temperature between about 600° and 750° F., a pressure between about 300 and 900 p.s.i.g. and a liquid hourly space velocity between about 0.05 and 0.4, while maintaining said bed of catalyst submerged in a substantially continuous phase of liquid feed with hydrogen passing upwardly therethrough, continuing said contacting for a period of at least about 10 days without regenerating said catalyst while correlating said hydrofining conditions to produce continuously a microwax product having an ASTM D–1500 color lgihter than about 3.0, said hydrofining catalyst being in the form of granules of size between about 1/16 inch and 8 mesh and comprising a granular carrier consisting essentially of alumina upon which is deposited minor proportions of a Group VIB metal and an iron-group metal in the form of sulfides and/or oxides.

2. A process as defined in claim 1 wherein said catalyst bed is maintained substantially submerged in feed by flowing both feed and hydrogen concurrently upwardly therethrough.

3. A process as defined in claim 1 wherein said catalyst bed is maintained substantially submerged in feed by flowing said feed downwardly, and said hydrogen countercurrently upwardly therethrough, and controlling the rate of withdrawal of liquid product so as to maintain a liquid level in the contacting zone.

4. A process as defined in claim 1 wherein said hydrofining catalyst is a sulfided composite of cobalt and molybdenum oxide supported on a carrier which is essentially activated alumina.

5. A process as defined in claim 1 wherein said hydrofining is carried out in the presence of a light petroleum distillate diluent for said feedstock.

6. A process as defined in claim 1 wherein said hydrofining is carried out at a temperature between about 625° and 700° F., a pressure between about 400 and 750 p.s.i.g. and a liquid hourly space velocity between about 0.1 and 0.25.

References Cited

UNITED STATES PATENTS

| | | | |
|---|---|---|---|
| 2,773,110 | 12/1956 | Luben | 208—27 |
| 2,846,356 | 8/1958 | Mills et al. | 208—27 |
| 2,956,001 | 10/1960 | Spars et al. | 208—27 |
| 2,998,377 | 8/1961 | Beuther et al. | 208—27 |
| 3,089,841 | 5/1963 | Berkowitz | 208—27 |
| 3,119,762 | 1/1964 | Siegmund | 208—27 |

PATRICK P. GARVIN, *Primary Examiner.*

DANIEL E. WYMAN, *Examiner.*

P. E. KONOPKA, *Assistant Examiner.*